United States Patent
Taffin et al.

(10) Patent No.: US 8,180,535 B2
(45) Date of Patent: May 15, 2012

(54) METHOD FOR CONTROLLING GEAR CHANGE DURING SHIFTING RULE OR VARIOGRAM SWITCHING

(75) Inventors: Christian Taffin, Le Mesnil St Denis (FR); Carine Poisson, Montlhery (FR)

(73) Assignee: Renault S.A.S., Boulogne Billancourt (FR)

(*) Notice: Subject to any disclaimer, the term of this patent is extended or adjusted under 35 U.S.C. 154(b) by 1206 days.

(21) Appl. No.: 11/658,078

(22) PCT Filed: Jul. 13, 2005

(86) PCT No.: PCT/FR2005/050582
§ 371 (c)(1),
(2), (4) Date: Mar. 22, 2007

(87) PCT Pub. No.: WO2006/018563
PCT Pub. Date: Feb. 23, 2006

(65) Prior Publication Data
US 2008/0262684 A1 Oct. 23, 2008

(30) Foreign Application Priority Data
Jul. 21, 2004 (FR) .................................. 04 51595

(51) Int. Cl.
G06F 7/00 (2006.01)
G06F 17/00 (2006.01)

(52) U.S. Cl. ............. 701/51; 701/55; 701/56; 701/102; 477/120; 477/125

(58) Field of Classification Search ............. 701/51, 701/57, 60, 54–56, 61, 102; 477/34, 43, 477/174, 120, 46, 121, 125; 74/473.21, 336 R
See application file for complete search history.

(56) References Cited

U.S. PATENT DOCUMENTS

| 4,312,249 | A | * | 1/1982 | Hau et al. ...................... 477/120 |
| 4,338,666 | A | * | 7/1982 | Suzuki et al. .................... 701/56 |
| 4,599,917 | A | * | 7/1986 | Leorat et al. ................... 477/120 |
| 4,889,015 | A | | 12/1989 | Kondo |
| 4,996,893 | A | | 3/1991 | Nakamura et al. |
| 5,079,704 | A | * | 1/1992 | Sakai et al. ...................... 701/57 |
| 5,079,705 | A | * | 1/1992 | Sakai et al. ...................... 701/57 |
| 5,101,350 | A | * | 3/1992 | Tokoro ............................. 701/57 |
| 5,157,609 | A | | 10/1992 | Stehle et al. |

(Continued)

FOREIGN PATENT DOCUMENTS

DE 44 40 706 5/1996

(Continued)

OTHER PUBLICATIONS

Nonlinear control of a continuously variable transmission (CVT) for hybrid vehicle powertrains; Setlur, P. et al; American Control Conference, 2001. Proceedings of the 2001; vol. 2; Digital Object Identifier: 10.1109/ACC.2001.945903; Publication Year: 2001, pp. 1304-1309 vol. 2.*

(Continued)

Primary Examiner — Cuong H Nguyen
(74) Attorney, Agent, or Firm — Oblon, Spivak, McClelland, Maier & Neustadt, L.L.P.

(57) ABSTRACT

The inventive method for controlling the gear change of an automatic gearbox provided with distinct shifting rules or variograms used according to a vehicle operating conditions consists in detecting and carrying out gear shifting requests sequential to the shifting rule or variogram switching, subject to the application of specific conditions only.

6 Claims, 2 Drawing Sheets

U.S. PATENT DOCUMENTS

| | | | | |
|---|---|---|---|---|
| 5,235,876 | A | * | 8/1993 | Minowa et al. .................. 74/337 |
| 5,262,952 | A | | 11/1993 | Tsuyama et al. |
| 5,289,740 | A | * | 3/1994 | Milunas et al. .................. 701/57 |
| 5,319,555 | A | * | 6/1994 | Iwaki et al. ...................... 701/57 |
| 5,323,318 | A | * | 6/1994 | Hasegawa et al. .............. 701/57 |
| 5,390,117 | A | | 2/1995 | Graf et al. |
| 5,439,349 | A | * | 8/1995 | Kupferberg ................. 415/212.1 |
| 5,459,658 | A | * | 10/1995 | Morey et al. ..................... 701/56 |
| 5,603,673 | A | * | 2/1997 | Minowa et al. ............... 477/110 |
| 5,631,831 | A | * | 5/1997 | Bird et al. ......................... 701/29 |
| 5,737,712 | A | * | 4/1998 | Han et al. .......................... 701/51 |
| 5,746,678 | A | * | 5/1998 | Roovers et al. .................. 477/45 |
| 5,857,161 | A | * | 1/1999 | Zeilinger et al. ................ 701/51 |
| 5,885,186 | A | * | 3/1999 | Van Wijk et al. ............... 477/43 |
| 5,899,290 | A | * | 5/1999 | Iwata ............................. 180/197 |
| 5,913,916 | A | * | 6/1999 | Bai et al. ........................... 701/59 |
| 5,948,033 | A | * | 9/1999 | Baer et al. ......................... 701/51 |
| 6,033,339 | A | * | 3/2000 | Aberson et al. .................. 477/46 |
| 6,044,317 | A | * | 3/2000 | Taffin ............................... 701/57 |
| 6,066,069 | A | * | 5/2000 | Vorndran ......................... 477/38 |
| 6,080,083 | A | | 6/2000 | Nishino |
| 6,115,661 | A | * | 9/2000 | Hosseini et al. ................. 701/51 |
| 6,246,942 | B1 | * | 6/2001 | Dobler et al. .................... 701/51 |
| 6,350,216 | B1 | * | 2/2002 | Speicher et al. ................. 477/37 |
| 6,577,939 | B1 | * | 6/2003 | Keyse et al. ..................... 701/55 |
| 6,671,602 | B1 | * | 12/2003 | Speicher et al. ................. 701/52 |
| 6,879,900 | B2 | * | 4/2005 | Henneken et al. .............. 701/51 |
| 7,003,387 | B2 | * | 2/2006 | Baize et al. ...................... 701/55 |
| 7,197,915 | B2 | * | 4/2007 | Luh et al. ................... 73/115.02 |
| 7,650,807 | B2 | * | 1/2010 | Poisson et al. .................. 74/335 |
| 2004/0249539 | A1 | * | 12/2004 | Luh et al. ......................... 701/51 |
| 2005/0114003 | A1 | * | 5/2005 | Baize ............................... 701/65 |
| 2007/0254774 | A1 | * | 11/2007 | Poisson ......................... 477/115 |
| 2008/0248923 | A1 | * | 10/2008 | Otsubo ......................... 477/124 |
| 2008/0293541 | A1 | * | 11/2008 | Kanafani et al. ............... 477/110 |
| 2010/0106383 | A1 | * | 4/2010 | Poisson et al. .................. 701/60 |

FOREIGN PATENT DOCUMENTS

| | | | |
|---|---|---|---|
| DE | PCT/DE02/04143 | * | 11/2002 |
| FR | 2 545 567 | | 11/1984 |
| FR | 2 741 931 | | 6/1997 |
| FR | 2 627 026 | | 1/2003 |
| FR | 2 827 026 | | 1/2003 |
| FR | PCT/FR2005/050880 | * | 1/2010 |
| JP | 402008546 A | * | 1/1990 |
| JP | 41063194 A | * | 3/1999 |
| JP | PCT/IB05/00196 | * | 3/2006 |
| JP | 02009216167 A | * | 9/2009 |
| WO | WO03/004910 | * | 1/2003 |

OTHER PUBLICATIONS

The power control and performance simulation for an electric transmission system of tracked vehicle; Yan Nanming et al.; Intelligent Control and Automation, 2004. WCICA 2004. Fifth World Congress on; vol. 5; Publication Year: 2004 , pp. 4558-4562 vol. 5.*

The Solution of Test plateform for Vehicle Automatic Transmission; Zeng Jie et al.; Control Conference, 2006. CCC 2006. Chinese; Digital Object Identifier: 10.1109/CHICC.2006.280634; Publication Year: 2006 , Page(s): 1256 - 1261.*

Global modeling and control strategy simulation for a hybrid electric vehicle using electrical variable transmission; Yuan Cheng et al.; Vehicle Power and Propulsion Conference, 2008. VPPC '08. IEEE; Digital Object Identifier: 10.1109A/PPC.2008.4677794 Publication Year: 2008 , pp. 1-5.*

Computer modeling of CVT ratio control system based on matlab; Wang Cheng; Jiang Chang-song; Computer Research and Development (ICCRD), 2011 3rd International Conference on; vol. 3; Digital Object Identifier: 10.1109/ICCRD.2011.5764266; Publication Year: 2011 , pp. 146-150.*

A 19MFLIPS CMOS fuzzy controller to control continuously variable transmission ratio; Naderi, A.; Aliasghary, M.; Pourazar, A.; Ghasemzadeh, H.; Ph.D. Research in Microelectronics and Electronics (PRIME), 2011 7th Conference on Digital Object Identifier: 10.1109/PRIME.2011.5966213; Publication Year: 2011 , pp. 45-48.*

The Solution of Test plateform for Vehicle Automatic Transmission; Zeng Jie et al.; Control Conference, 2006. CCC 2006. Chinese; Digital Object Identifier: 10.1109/CHICC.2006.280634; Publication Year: 2006 , pp. 1256-1261.*

Ratio control of CVT on dynamic characteristics; Xia Jingjing; Hu Chen; Computer, Mechatronics, Control and Electronic Engineering (CMCE), 2010 International Conference on; vol. 3; Digital Object Identifier: 10.1109/CMCE.2010.5610245; Publication Year: 2010 , pp. 546-549.*

* cited by examiner

METHOD FOR CONTROLLING GEAR CHANGE DURING SHIFTING RULE OR VARIOGRAM SWITCHING

The present invention relates to the control of automatic vehicle transmissions with discrete ear ratios and also continuous variations, of the automatic gearbox type, robotized gearbox type or continuously or infinitely variable transmission.

BACKGROUND

More precisely, it relates to the control of changes of gear ratio of an automatic transmission programmed with distinct shifting rules or variograms, applied according to the operating conditions of the vehicle.

According to a traditional system, illustrated in particular by French Patent 2545567, the decisions to change year ratios of a transmission with discrete gear ratios are made when a point representative of the operation of the transmission in a coordinate plane defined by speed of travel of the vehicle and engine load (accelerator pedal position, engine torque power etc.) intersects an upshift curve or a downshift curve. In this representation, the set of upshift and downshift curves defines a shifting rule that controls, for the transmission, the set of situations encountered by the vehicle, its power train and its operator.

In the case of infinitely or continuously variable transmissions, the variations of gear ratios are controlled by a map or variogram comprising an analog grouping of a family of shift curves covering the entire range of transmission ratios.

The shifting rules and the variograms are generally established in such a way that fuel consumption is as low as possible, subject to acoustic comfort and satisfactory acceleration. Under these conditions, upshifts at low and medium load are most often effected at low engine speed.

On these basic principles there were developed what are known as "auto-adaptive" transmissions, which can comprise as illustrated by French Patent 2741931, several shifting rules, adapted to diverse traffic conditions (city, uphill, downhill, etc.) to the driving style of the operator, etc., in order to improve driving pleasure under all circumstances. Transmissions programmed with auto-adaptive rules are capable of switching between different shifting runes or variograms (when the gear ratio is continuously variable).

A switch of shifting rules or of variograms can be felt immediately by a change of gear ratio, which may surprise the operator. In fact, such a change of gear ratio results primarily from a response of the transmission to the evolution of its own operation and not to a modification of the operator's intent or behavior and/or of the vehicle. Such a situation may be encountered under similar conditions in the case of transmissions with discrete transmission ratios and in that of continuous transmissions.

BRIEF SUMMARY

The purpose of the invention is to remedy this disadvantage of known auto-adaptive transmissions with discrete gear ratios and with continuous variation.

With this objective, it proposes that requests for gear ratio changes following a switch of shifting rule or of variogram be detected and executed solely subject to verification of restrictive conditions.

According to the invention, for a transmission with discrete gear ratios, requests to shift to a lower or higher gear ratio following a switch of shifting rule of the automatic transmission with discrete gear ratios are temporarily suspended.

For a transmission with continuous variation, the gear ratio requested following a switch of variogram is subjected to filtering with a relatively long time constant.

BRIEF DESCRIPTION OF THE DRAWINGS

The present invention will be better understood by reading the description hereinafter of a non-limitative embodiment thereof in conjunction with the attached drawings wherein.

DETAILED DESCRIPTION

Figure 1:
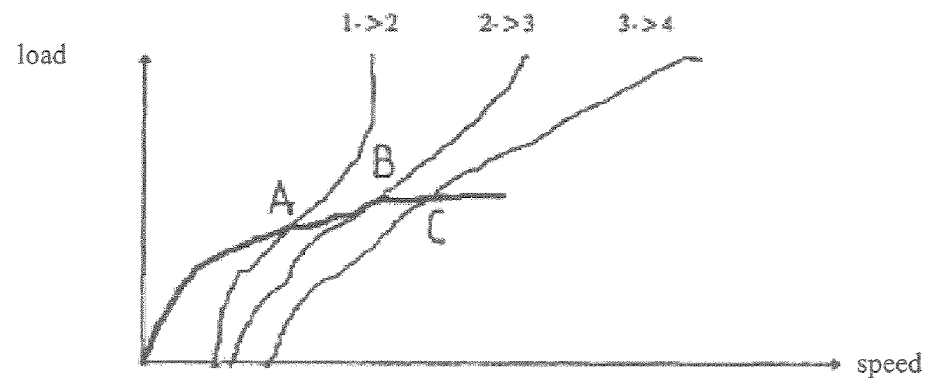
FIG. 1 sets forth the general principle of shifting rules for gear ratios.

FIG. 1 illustrates the changes of gear ratios of a transmission with discrete gear ratios, for example, when the vehicle is in an accelerating phase. In this non-limitative example of a sequence, the shifts take place successively at points A, B and C of intersection of curves 1/2, 2/3, 3/4 in a plane of vehicle travel speed versus engine load. According to the teaching of French Patent 2545567, the downshift curves (not illustrated on the diagram) would be offset to the left relative to the corresponding upshift curves, in order to limit the phenomena of oscillation between two consecutive gear ratios, or in other words the "hunting" phenomena.

In the case of an auto-adaptive transmission, which is programmed with a plurality of shifting rules, several sets of curves corresponding to each shifting rule are also present in one plane. However, the sets of curves are offset relative to one another. In the case of a switch of shifting rule, therefore, a change of gear ratio may occur because one curve passes ahead of an operating point. This shift of speed, which undoubtedly would not have happened in the absence of the switch of shifting rule, may surprise the operator.

Figure 4:
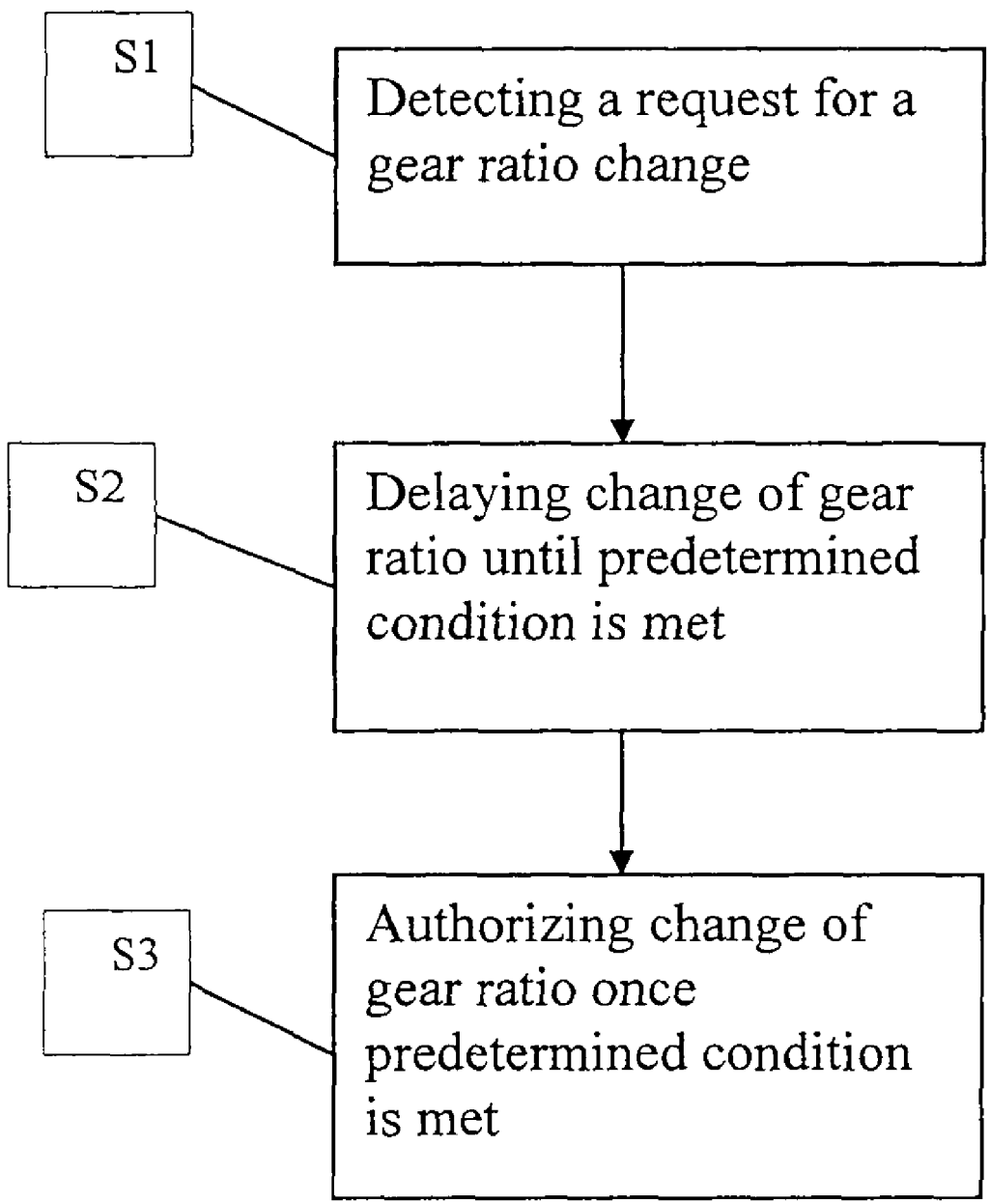
FIG. 4 illustrates an example method of controlling the change of the gear ratio in a transmission.

According to the invention, as shown in FIG. 4, a request to shift to a lower or higher gear following a switch of shifting rule is detected (S1). The requests to shift to a lower or higher gear ratio following a switch of shifting rule of an automatic transmission with discrete gear ratios are temporarily suspended until a predetermined condition is met (S2). Nevertheless, they may be authorized (S3) if the predetermined condition, such as the vehicle loses speed, when the difference between the vehicle speed at the instant of switching of the shifting rule and the instantaneous vehicle speed exceeds a predetermined difference threshold, is met. This condition makes it possible to improve the responsiveness of the vehicle whenever necessary, without surprising the operator.

The shift may also be authorized if the operator is accelerating rapidly, for example when the signal transmitted by the accelerator pedal sensor is strengthening rapidly, or when its derivative with respect to time is positive and high. This condition makes it possible to improve the responsiveness of the vehicle when the operator is expressing a desire for rapid acceleration.

Figure 2:
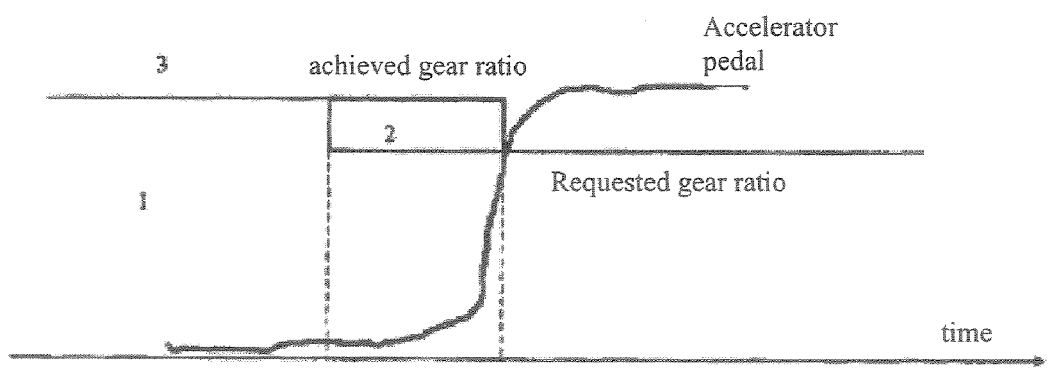
FIG. 2 illustrates an example of management of the shift to a lower gear ratio in a transmission with discrete gear ratios.

FIG. 2 illustrates the application of this device in the case in which a request to change to a lower gear ratio (3/2) takes place following a switch of shifting rules. This diagram, showing the pedal position and the transmission ratio on a time axis, reveals the offset between the request to change gear ratio and implementation thereof. Thus shifting takes place only when the operator has strongly depressed his accelerator pedal, thus showing his desire for rapid acceleration.

As regards requests to shift to a lower gear ratio, the invention therefore provides that they will be authorized following a switch of shifting rule only if one of the following conditions is met:

the vehicle is undergoing a speed reduction that in absolute value is larger than a specified speed difference threshold, or the vehicle is undergoing significant positive acceleration.

The displacement of the accelerator pedal or the rate of displacement thereof can be used to appraise whether the acceleration is sufficient.

Thus, according to the invention, the shift to the lower gear ratio may be authorized if the depression of the accelerator pedal is greater in absolute value than a specified displacement threshold, or if the derivative of the depression of the pedal is greater in absolute value than a pre-established rate of displacement threshold.

The invention also proposes special measures to authorize, under certain conditions, shifting to a higher gear ratio following a switch of shifting rules. Shifting will be authorized if the time elapsed from the instant of the switch of shifting rule is long (several seconds): this condition ensures that a request to shift to a higher gear ratio will not be blocked too long. It will also be authorized if the operator relaxes the accelerator gradually (and not abruptly), or if the engine speed becomes too high (to limit acoustic discomfort).

According to the invention, shifts to higher gear ratio following a switch of shifting rule are therefore authorized if one of the following conditions is met:

the time elapsed since the switch exceeds a pre-established duration threshold, the relaxation of the accelerator pedal is smaller in absolute value than a predetermined displacement threshold, or the engine speed exceeds a pre-established speed threshold.

The invention is also applicable to the case of transmissions with continuous variation of gear ratio, or continuously variable transmissions. In this case, the general principle of the invention, according to which requests to change gear ratio following a switch of shifting rule or variogram are detected and executed solely subject to application of special conditions is implemented in the following manner.

When a change of gear ratio or speed ratio is requested following a switch of variogram, the requested gear ratio is filtered by means of a filter the nature of which is not limitative (first-order filter, ramp, etc.), but whose time constant is still relatively long. Thus the requested gear ratio undergoes filtering with a relatively long time constant.

Figure 3:
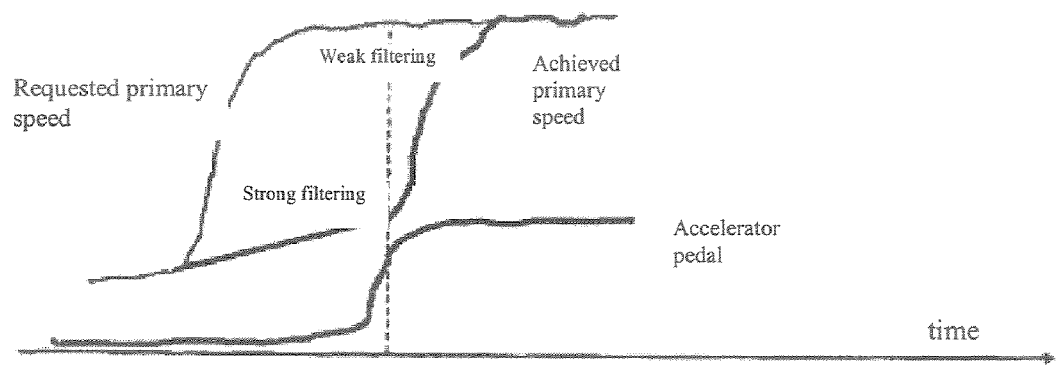
FIG. 3 illustrates an example of management of the shift to a lower gear ratio in a transmission with continuous gear ratio changes.

FIG. 3 illustrates the case of a request for a reduction of gear ratio induced by a large increase in the primary speed of the gearbox. In this example, the increase takes place following a switch of variogram. According to the invention, strong filtering is applied to the primary speed setpoint; upon detection of the operator's wish for acceleration, in the form of rapid depression of the accelerator pedal, weaker filtering is applied, and the primary speed then quickly converges with the requested value.

In the case of a reduction of gear ratio, the time constant becomes short (in order to favor responsiveness of the vehicle) if the vehicle is losing speed. This situation can be taken into account as soon as the difference between the vehicle speed at the instant of the switch of shifting rule and the instantaneous vehicle speed exceeds a threshold, which can be established by calibration.

This provision makes it possible to improve the responsiveness of the vehicle when necessary, without surprising the operator. The time constant can also be shortened when the operator is accelerating strongly, for example if the signal transmitted by the accelerator pedal sensor is high, or when its derivative with respect to time is positive and high. This condition makes it possible to improve the responsiveness of the vehicle when the operator expresses a wish for rapid acceleration.

In general, in the case of a request for a reduction of gear ratio following a switch of variogram, the invention provides that the time constant will be shortened if one of the following conditions is met:

the vehicle has experienced, since the switch of variogram, a reduction of speed such that the difference between its instantaneous speed and its speed during the switch is larger in absolute value than a pre-established threshold, or the vehicle is undergoing significant positive acceleration.

The deceleration may be sufficient as soon as the depression of the accelerator pedal exceeds, in absolute value, a specified displacement threshold, or as soon as the derivative of depression of the pedal exceeds, in absolute value, a pre-established rate of displacement threshold.

In the case of a request for an increase of gear ratio, the increase of gear ratio is also achieved with a filtering constant. When the primary speed requested by the variogram drops following a switch of variogram (phenomenon equivalent to an upshift in the case of a transmission with discrete gear ratios), then a filter is applied. This filter may be of the first order, with a time constant Tau that slows the drop of primary speed of the transmission and therefore the drop of speed of rotation of the engine in controlled manner.

This filter constant Tau will be shorter if the operator relaxes the accelerator gradually and not abruptly, for example if the signal transmitted by the accelerator pedal sensor is weakening in time. The constant will also be shorter when the engine speed becomes too high (in order to limit acoustic discomfort).

Thus, in the case of a request for an increase of gear ratio following a switch of variogram, the time constant is shortened if one of the following conditions is met:

the relaxation of the accelerator pedal is smaller in absolute value than a predetermined displacement threshold, or the engine speed exceeds a pre-established speed threshold.

The invention claimed is:

1. A method for control of a gear ratio of a transmission of a vehicle, the transmission being a continuously variable transmission programmed with variograms including a plurality of shifting curves, and applied according to operating conditions of the vehicle, comprising:

detecting a request for an increase of a gear ratio following a switch of variogram;

after the detecting the request for the increase of the gear ratio, filtering the request for the gear ratio change such that the gear ratio change is delayed by a time constant relaxation of an accelerator pedal is smaller in absolute value than a predetermined displacement threshold, or engine speed exceeds a pre-established speed threshold; and authorizing the request for the increase of the gear ratio once the relaxation of the accelerator pedal is smaller than the predetermined displacement threshold, or the engine speed exceeds the pre-established speed threshold.

2. A method for control of changes of a gear ratio of an automatic transmission of a vehicle programmed with distinct shifting rules, and applied according to operating conditions of the vehicle, comprising:
  detecting a request for a gear ratio change to a lower gear ratio following a switch of shifting rule;
  after the detecting the request for the gear ratio change, delaying the gear ratio change until depression of an accelerator pedal is greater in absolute value than a specified displacement threshold or a derivative of the depression of the accelerator pedal is greater in absolute value than a pre-established rate of displacement threshold; and
  authorizing the gear ratio change to the lower gear once the depression of the accelerator pedal is greater than the specified displacement threshold or the derivative of the depression of the accelerator pedal is greater than the pre-established rate of displacement threshold.

3. A method for control of changes of a gear ratio of an automatic transmission of a vehicle programmed with distinct shifting rules, and applied according to operating conditions of the vehicle, comprising:
  detecting a request for a gear ratio change to a lower gear ratio following a switch of shifting rule;
  after the detecting the request for the gear ratio change, delaying the gear ratio change until the vehicle is undergoing a speed reduction that in absolute value is larger than a specified speed difference threshold, or the vehicle is undergoing positive acceleration greater than a predetermined threshold; and
  authorizing the gear ratio change to the lower gear once vehicle is undergoing the speed reduction that is larger than the specified speed difference threshold, or the vehicle is undergoing the positive acceleration greater than the predetermined threshold.

4. A method for control of changes of a gear ratio of an automatic transmission of a vehicle programmed with distinct shifting rules, and applied according to operating conditions of the vehicle, comprising:
  detecting a request for a gear ratio change to a higher gear following a switch of shifting rule;
  after the detecting the request for the gear ratio change, delaying the gear ratio change until a predetermined time has elapsed since the switch exceeds a pre-established duration threshold, or relaxation of an accelerator pedal is smaller in absolute value than a predetermined displacement threshold, or engine speed exceeds a pre-established speed threshold; and
  authorizing the request for the gear ratio change once the predetermined time has elapsed since the switch exceeds the pre-established duration threshold, or relaxation of the accelerator pedal is smaller in absolute value than the predetermined displacement threshold, or the engine speed exceeds the pre-established speed threshold.

5. A method for control of a gear ratio of a transmission of a vehicle, the transmission being a continuously variable transmission programmed with variograms including a plurality of shifting curves, and applied according to operating conditions of the vehicle, comprising:
  detecting a request for a reduction of a gear ratio following a switch of variogram;
  after the detecting the request for the reduction of the gear ratio, filtering the request for the gear ratio change such that the gear ratio change is delayed until the vehicle has experienced, since the switch of variogram, a reduction of speed such that a difference between an instantaneous speed and a speed of the vehicle during the switch is larger in absolute value than a pre-established threshold, or the vehicle is undergoing positive acceleration above a predetermined threshold; and
  authorizing the request for the reduction of the gear ratio once the vehicle has experienced, since the switch of variogram, the reduction of speed larger than the pre-established threshold, or the vehicle is undergoing positive acceleration above the predetermined threshold.

6. A method for control of a gear ratio of a transmission of a vehicle, the transmission being a continuously variable transmission programmed with variograms including a plurality of shifting curves, and applied according to operating conditions of the vehicle, comprising:
  detecting a request for a reduction of a gear ratio following a switch of variogram;
  after the detecting the request for the reduction of the gear ratio, filtering the request for the gear ratio change such that the gear ratio change is delayed until depression of an accelerator pedal exceeds, in absolute value, a specified displacement threshold; and
  authorizing the request for the reduction of the gear ratio once the depression of the accelerator pedal exceeds the specified displacement threshold.

* * * * *